Patented Aug. 7, 1945

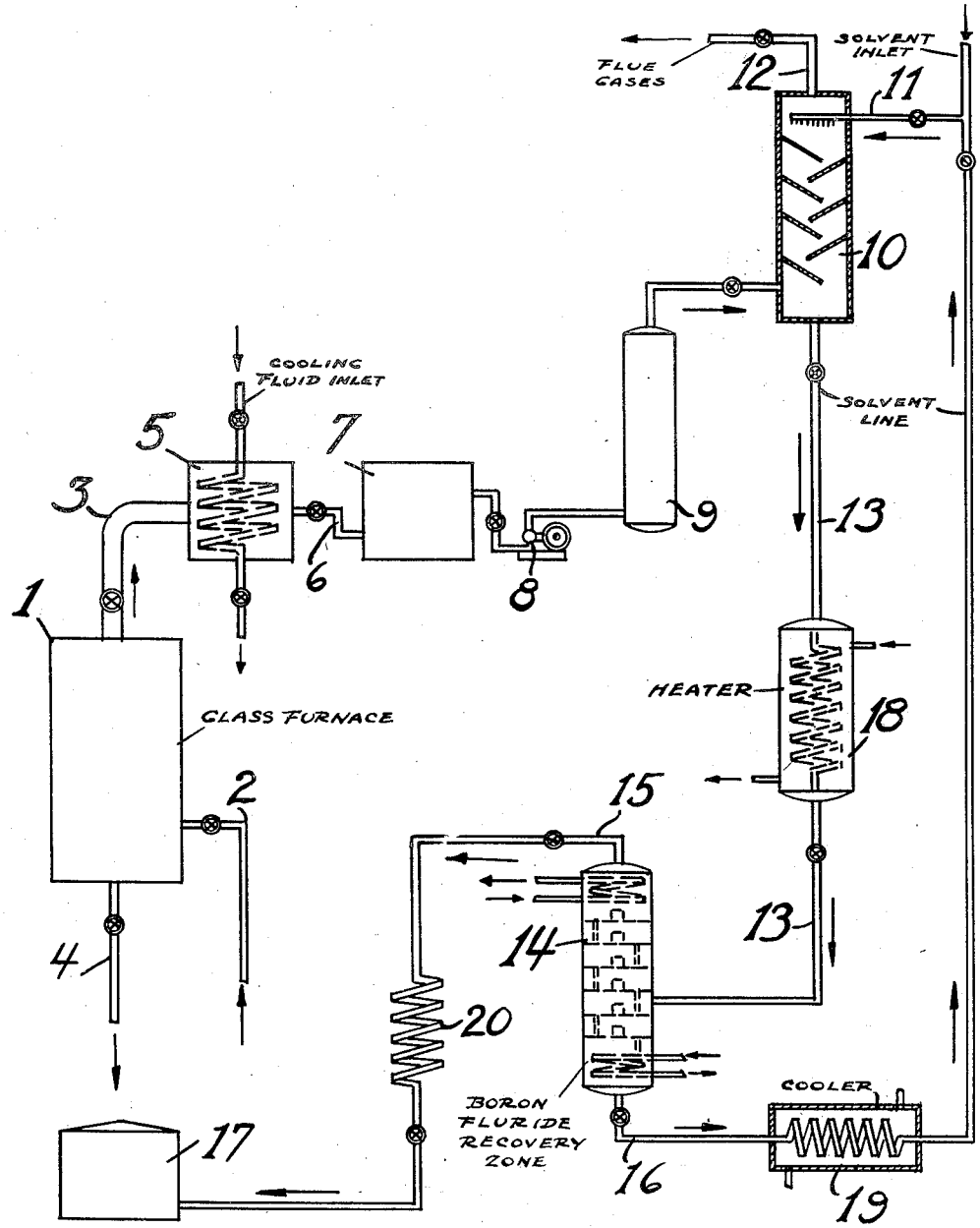

2,381,027

UNITED STATES PATENT OFFICE 2,381,027

PROCESS FOR RECOVERING BORON FLUORIDE

Emile L. Baldeschwieler, Cranford, and Peter J. Gaylor, Union, N. J., assignors to Standard Oil Development Company, a corporation of Delaware Application March 21, 1941, Serial No. 384,484

4 Claims. (Cl. 23—205)

The present invention is concerned with the production of boron fluoride. The invention is more particularly concerned with the production and segregation of boron fluoride from gases evolved during the manufacture of certain types of glass.

In the manufacture of boro-silicate glass and similar boron containing glasses, gases are evolved which are generally considered as industrial waste products. One object of the present invention is to convert such waste products or portions thereof into a valuable chemical boron fluoride and to recover the same. Another object is to employ a new useful recovery operation by which boron fluoride is made readily available for commercial use in a substantially complete pure state. Other objects will become apparent from the subsequent description of the invention.

In the manufacture of boro-silicate glass it is a conventional practice to prepare the same by mixing a boron compound such as boron oxide, borax, and the like, with various fluorides as, for example, calcium fluoride and potassium fluoride. Other materials such as sand, soda, and the like are also utilized. In the melting operation various gases are liberated which comprise carbon dioxide, sulfur trioxide, boron fluoride, and the like. In accordance with the present invention these gases are treated under conditions whereby valuable boron fluoride is produced and recovered in a substantially pure state.

Our process may be readily understood by reference to the drawing illustrating an embodiment of the same. For the purpose of description, it is assumed that a continuous operation is employed and that the constituents for the manufacture of glass comprising boric oxide, calcium fluoride, sand, and soda are introduced into glass furnace zone 1 by means of line 2. The temperature is adjusted in zone 1 to melt the various constituents for the production of glass, such conditions being sufficient to cause the boron compound and the fluoride mineral to react and form some boron fluoride which, together with other by-product gases, is removed by means of flue 3. The molten glass is withdrawn from zone 1 by means of line 4 and handled as desired, while the reaction gases comprising boron fluoride are introduced into cooling zone 5 wherein the temperature of the same is reduced to the desired extent. The gases may be cooled utilizing an indirect transfer operation or the cooling may be effected by quenching the gases with a non-reactive cooling liquid. Suitable liquids are, for example, aluminum chloride, or a boron fluoride treated petroleum oil such as an oil boiling in the kerosene or heavy naphtha boiling range. The cooled gases are withdrawn from cooling zone 5 by means of line 6 and introduced into storage zone 7. The gases are withdrawn from storage zone 7, compressed to the desired extent by means of compressors 8 and passed into treating zone 9. In treating zone 9 the compressed gases are treated with lime or an equivalent treating agent under conditions to remove the carbon dioxide and the sulfur trioxide without effecting any substantial removal of the boron fluoride. The gases free of carbon dioxide and sulfur trioxide are withdrawn from treating zone 9 and passed into absorption zone 10 wherein they are countercurrently contacted with a solvent which is characterized by having a preferential selectivity for the boron fluoride as compared to the other gaseous constituents. For the purpose of description it is assumed that the selective solvent comprises concentrated sulfuric acid. The sulfuric acid is introduced into zone 10 by means of line 11 and withdrawn by means of line 13. Gases substantially completely free of boron fluoride are removed overhead from absorption zone 10 by means of line 12 and handled or disposed of in any manner desired. The absorption solvent containing dissolved therein the boron fluoride is removed from absorption zone 10 by means of line 13 and passed into boron fluoride recovery zone 14. The temperature of the solvent removed from the bottom of absorption zone 10 may be raised to the desired degree by passing the same through heating zone 18. Temperature and pressure conditions are adjusted in zone 14 adapted to separate the boron fluoride from the solvent and to remove the same overhead by means of line 15. The solvent free of boron fluoride is removed from recovery zone 14 by means of line 16, cooled in zone 19 and recycled to absorption zone 10. The substantially pure boron fluoride removed overhead by means of line 15 is cooled in cooling zone 20, passed to storage zone 17, and further handled as desired. The process of the present invention may be widely varied. It is to be understood that the respective zones 1, 5, 7, 9, 10 and 14 may comprise any suitable number and arrangement of units.

The solvent used may be any substance which has a preferential selectivity for the boron fluoride as compared to the other constituents remaining in the gas. In general, we have found that concentrated mineral acids, particularly sulfuric acids, having a concentration above 88% are especially desirable. However, other solvents such as chlorsulfonic, acids of phosphorus, carbon disulfide, chlorinated or fluorinated hydrocarbons, tricyclohexyl phosphate, or substituted phosphoric acids may be used. The solvents, in general, are characterized by being non-reactive with boron fluoride.

The temperature conditions in the absorption zone will be adjusted to secure the desired absorption of the boron fluoride. It is preferred to employ temperatures in the range from about 60° F. to 120° F. It is also preferable that temperatures above atmospheric be employed in the absorption zone. Preferred pressures are in the range from about 25 to 200 pounds per square inch gauge. Although it is desirable to extract the gases as such, under certain conditions it may be preferred to liquefy the gases and to fractionate the crude boron fluoride from the other components and then to purify the boron fluoride completely by treating the same with a selective solvent. The quantity of solvent employed will vary considerably depending upon operating conditions. A preferred operation is to adjust the quantity of solvent with respect to operating conditions so as to secure removal of about 70% to 90% of the boron fluoride from the gases.

What we claim as new and desire to protect by Letters Patent is:

1. Process for recovering boron fluoride from gases evolved in the production of boron containing glass, which comprises cooling the gases to a substantially lower temperature, removing the carbon dioxide and sulfur trioxide therefrom by treatment with anhydrous lime, contacting the remaining gases under pressure with a solvent which has a preferential solubility for boron fluoride as compared with other constituents of the gases, and separating the absorbed boron fluoride from the solvent.

2. Process according to claim 1 in which the solvent is sulfuric acid.

3. Process according to claim 1 in which the solvent is sulfuric acid having a concentration of at least 88%.

4. Process according to claim 1 in which the gases are treated with the solvent at a temperature between 60 and 120° F. and under a pressure between 25 and 200 pounds per square inch.

EMILE L. BALDESCHWIELER.
PETER J. GAYLOR.